United States Patent [19]

Funaki

[11] Patent Number: 4,979,034
[45] Date of Patent: Dec. 18, 1990

[54] IMAGE MEMORY APPARATUS
[75] Inventor: Shinsuke Funaki, Hino, Japan
[73] Assignee: Konica Corporation, Tokyo, Japan
[21] Appl. No.: 379,477
[22] Filed: Jul. 13, 1989
[30] Foreign Application Priority Data Jul. 21, 1988 [JP] Japan .................................. 63-183101
Jul. 26, 1988 [JP] Japan .................................. 63-187279

[51] Int. Cl.$^5$ .......................... H04N 7/18; H04N 7/00
[52] U.S. Cl. .................................. 358/93; 358/213.19; 358/101; 358/105; 358/909
[58] Field of Search ................. 358/909, 168, 93, 101, 358/213.19, 105, 335; 360/9.1

[56] References Cited

U.S. PATENT DOCUMENTS 4,679,084  7/1987  Topper et al. ...................... 358/105
4,713,693 12/1987  Southworth et al. ............... 358/105
4,747,148  5/1988  Watanabe et al. .................. 358/101
4,792,863 12/1988  Urabe ................................. 358/909
4,860,096  8/1989  Long et al. ......................... 358/105
4,862,273  8/1989  Ushida et al. .................. 358/213.19

Primary Examiner—John K. Peng
Attorney, Agent, or Firm—Finnegan, Henderson, Farabow, Garrett & Dunner

[57] ABSTRACT

An image memory apparatus having a photographing device for taking an image of a subject, an image memory device for storing the video signals from the photographing device, a detecting device for detecting changes in brightness level of the video signals, and a control device for supplying to the image memory device a write control signal according to the brightness level changes. The image that exists in a field where the brightness level change in the video signal occurs is stored in memory to freeze that image.

5 Claims, 13 Drawing Sheets

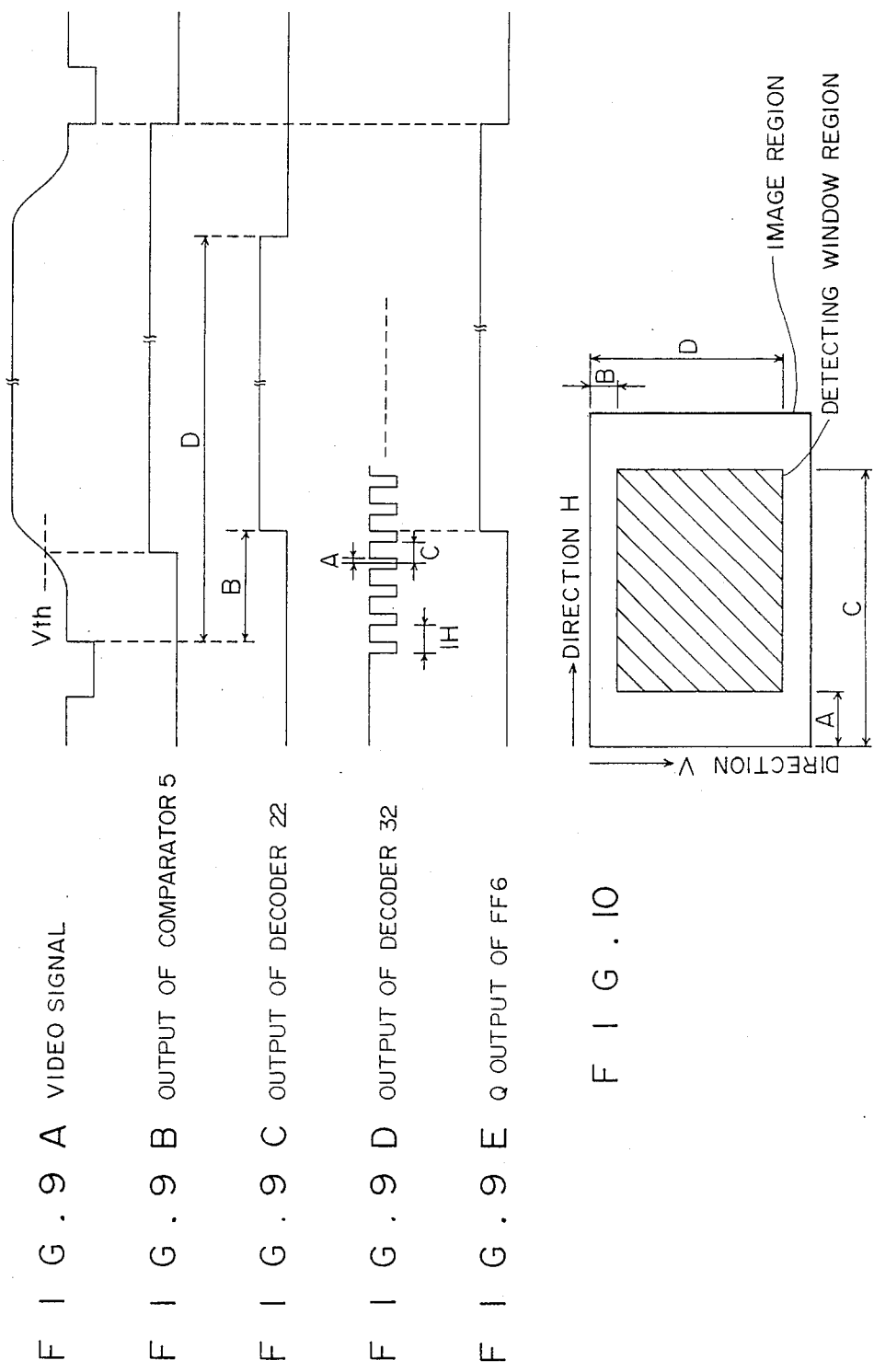

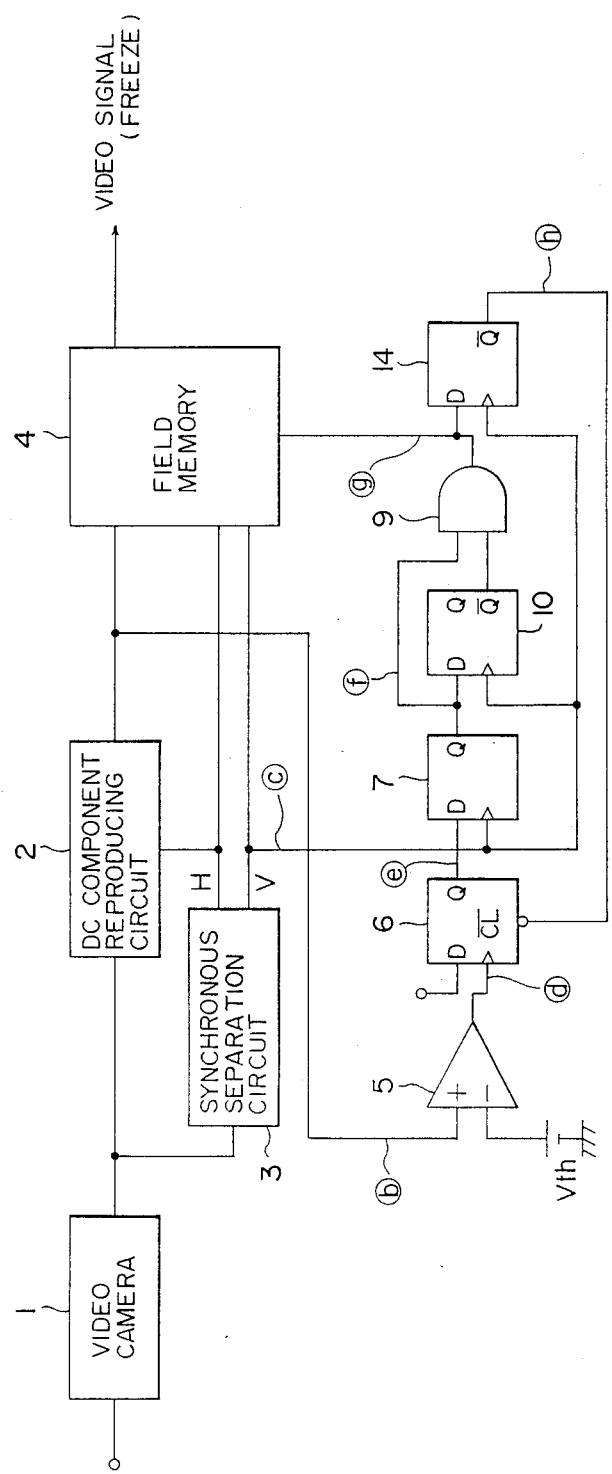

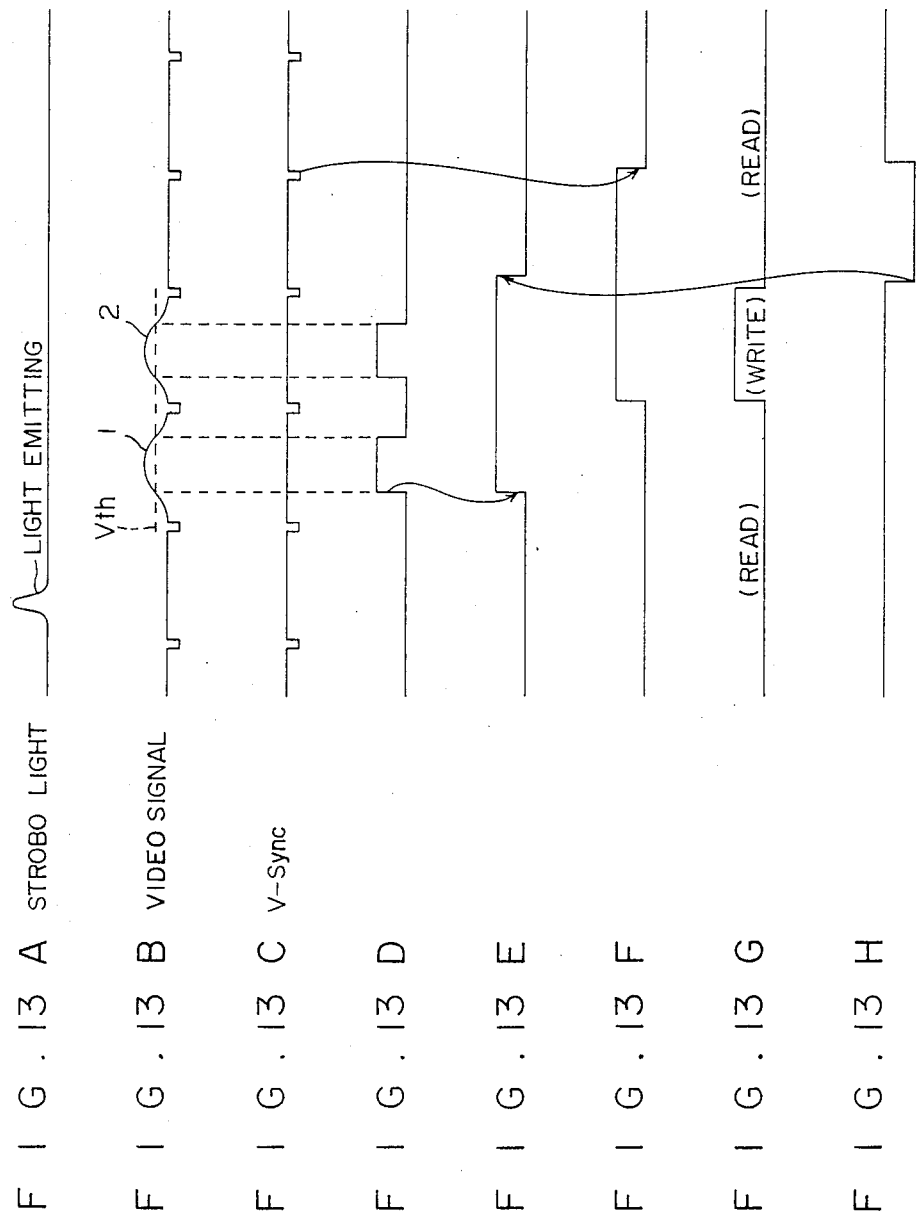

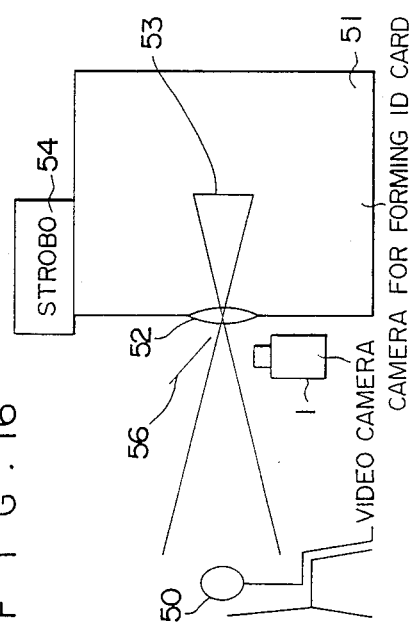
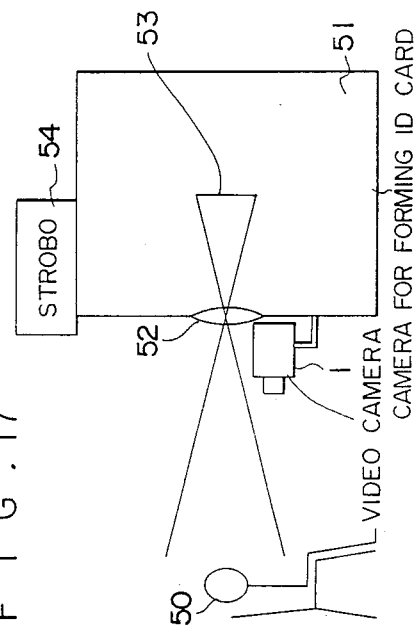
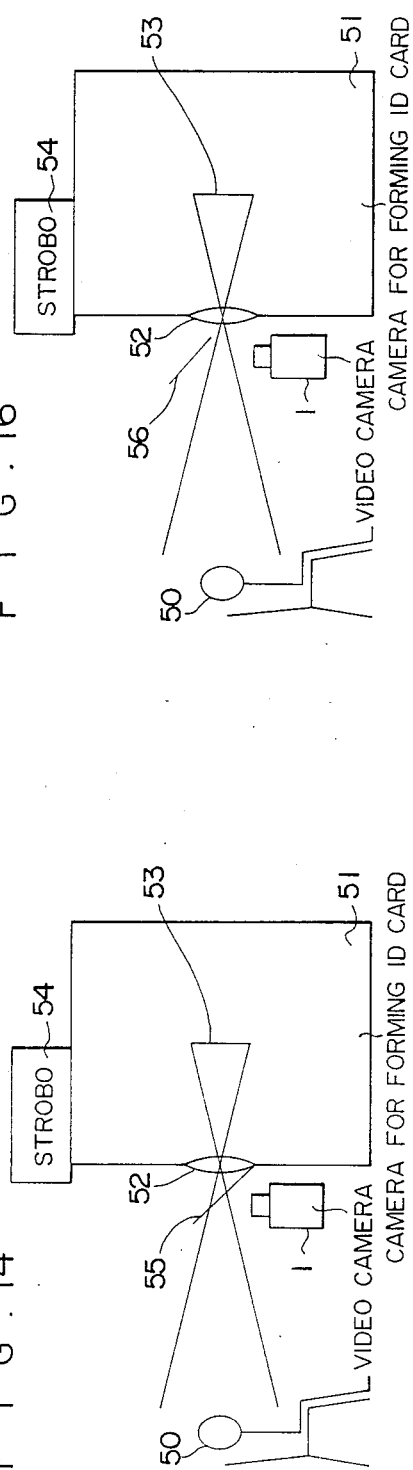
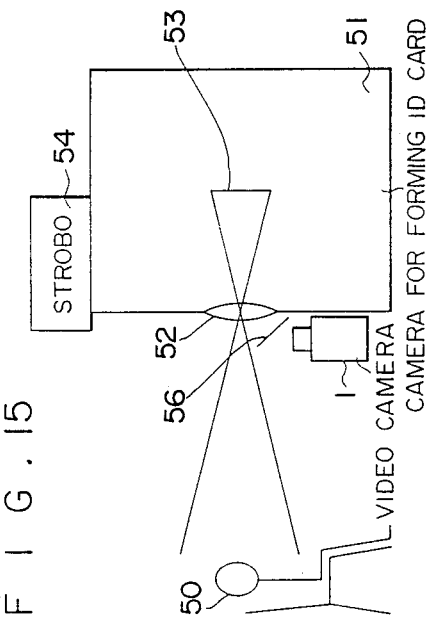

4,979,034

IMAGE MEMORY APPARATUS

BACKGROUND OF THE INVENTION

1. Field of the Invention

This invention relates to an image memory apparatus and more particularly to an image memory apparatus suitably applied for storing images in synchronism with the flashing of a strobo.

2. Description of the Prior Art

As an apparatus for freezing (fixing) and image taken by the video camera in synchronism with a strobo light, the following types are available.

(1) An apparatus which detects the strobo light by a sensor (strobo synchronizer) and uses a sensor signal as a trigger to store the image from the video camera in a still video recording apparatus.

(2) An apparatus which detects the strobo light by a sensor (strobo synchronizer) and uses a sensor signal as a trigger to store the image for the video camera in a semiconductor memory.

Such apparatuses have the following drawbacks. When the still video recording apparatus is used, only 50 images can be stored in one video floppy disc. This device is therefore not suited for storing a large amount of data. It also requires a sensor to detect the strobo light.

On the other hand, when the semiconductor memory is used, the limit on the number of images can be eliminated by increasing the memory capacity. However, it still requires the sensor to detect the strobo light as in the first device. If the sensor is not incorporated, the strobo flashing timing has to be controlled from the memory side. In this case, it is not possible to use a strobo that flashes at any desired timing.

When we consider renewing the frozen image, the apparatus using the still video recording device requires that the tracks that were recorded with a image in synchronism with the strobo light be reproduced for a certain period of time and then the recording head be moved to the unrecorded track before setting the apparatus in the recording standby mode. Or the apparatus requires manual switching from the reproducing mode to the recording standby mode. In the case of the apparatus using semiconductor memory, it is necessary to clear the stored contents at certain time intervals or press a reset switch. In either case, the problem is determining how long the clearing intervals should be set. Also it is a nuisance to press the recording standby switch or the reset switch each time the image is renewed.

SUMMARY OF THE INVENTION

This invention has been accomplished with a view to overcoming the above drawbacks. An object of the invention therefore is to realize an image memory apparatus which can freeze in memory the image from the video camera in synchronism with the flashing strobo that flashes at a desired timing and which can also freeze new image each time the strobo flashes.

To achieve the above objective, the image memory apparatus of this invention comprises: a photographing means for taking an image of a subject and outputting video signals of the image; an image memory means for storing the video signals from the photographing means; a detecting means for detecting changes in brightness level of the video signals from the photographing means; and a control signal generating means for supplying to the image memory means a write control signal according to the level changes of the video signal detected by the detecting means; whereby the image that exists in a field where the brightness level change in the video signal occurs is stored in memory to freeze that image.

In the apparatus according to this invention, when the video signal level exceeds the specified value, the write control signal is given to the image memory means. The image memory means stores the video signals in that field. Then the stored image is read out.

Now, by referring to the attached drawings, these and other objects and features will be described in detail.

BRIEF DESCRIPTION OF THE DRAWINGS

FIGS. 9A to 9E are timing charts showing the sequence of operastion of the apparatus of FIG. 8;

FIG. 10 is a diagram showing a detecting window of an image;

FIG. 12 is a block diagram showing the configuration of still another embodiment of the invention;

FIGS. 13A to 13H are timing charts showing the sequence of operation of the apparatus of FIG. 12; and FIGS. 14 to 17 are examples of application of this invention.

DESCRIPTION OF THE PREFERRED EMBODIMENTS

Figure 1:
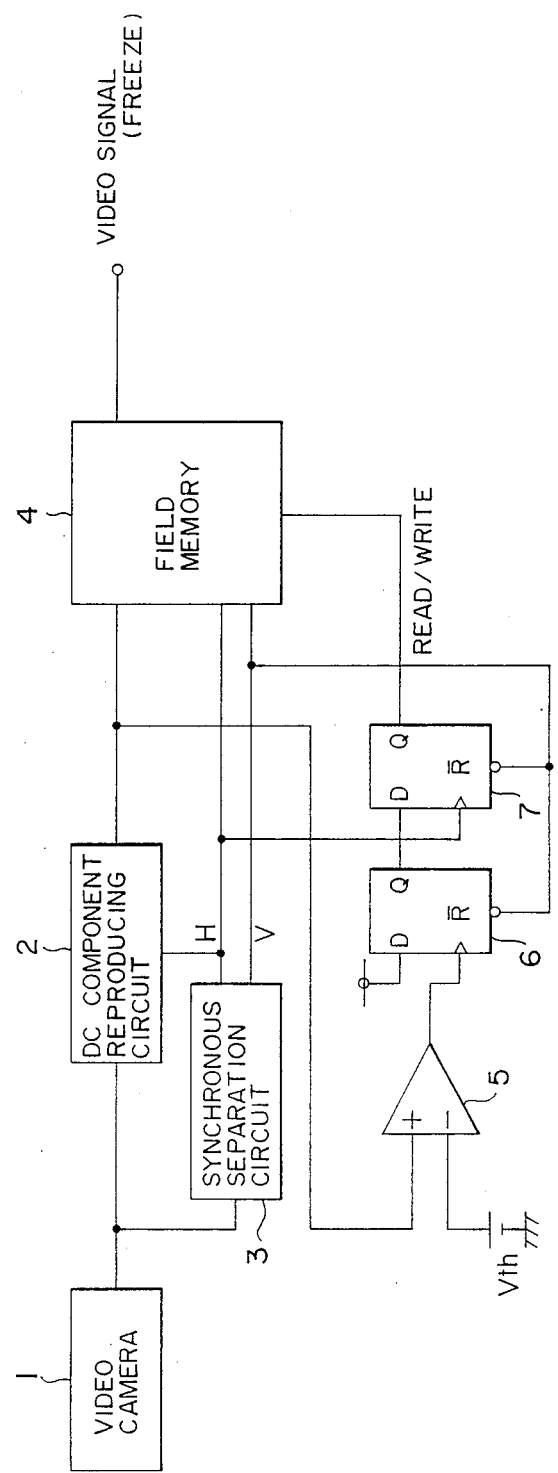
FIG. 1 is a block diagram showing the configuration of one embodiment of this invention.

FIG. 1 shows the configuration of one embodiment of this invention. In the figure, reference numeral 1 represents a video camera of frame accummulation type that takes the image of a subject and produces corresponding video signals. Denoted 2 is a dc component reproducing circuit that reproduces the dc component of the video signal; 3 a synchronizing signal separation circuit that separates the synchronizing signal (vertical (V) synchronizing signal and horizontal (H) synchronizing signal) from the video signal; and 4 a field memory to store the image. Designated 5 is a comparator that compares the reproduced dc component of the video signal with a reference voltage, 6 and 7 are D-type flip-flops.

FIGS. 2A to 2D show the waveforms of each part of the apparatus of FIG. 1. FIGS. 3A to 3D are magnified waveforms of a section 1 of FIG. 2.

Figure 2:
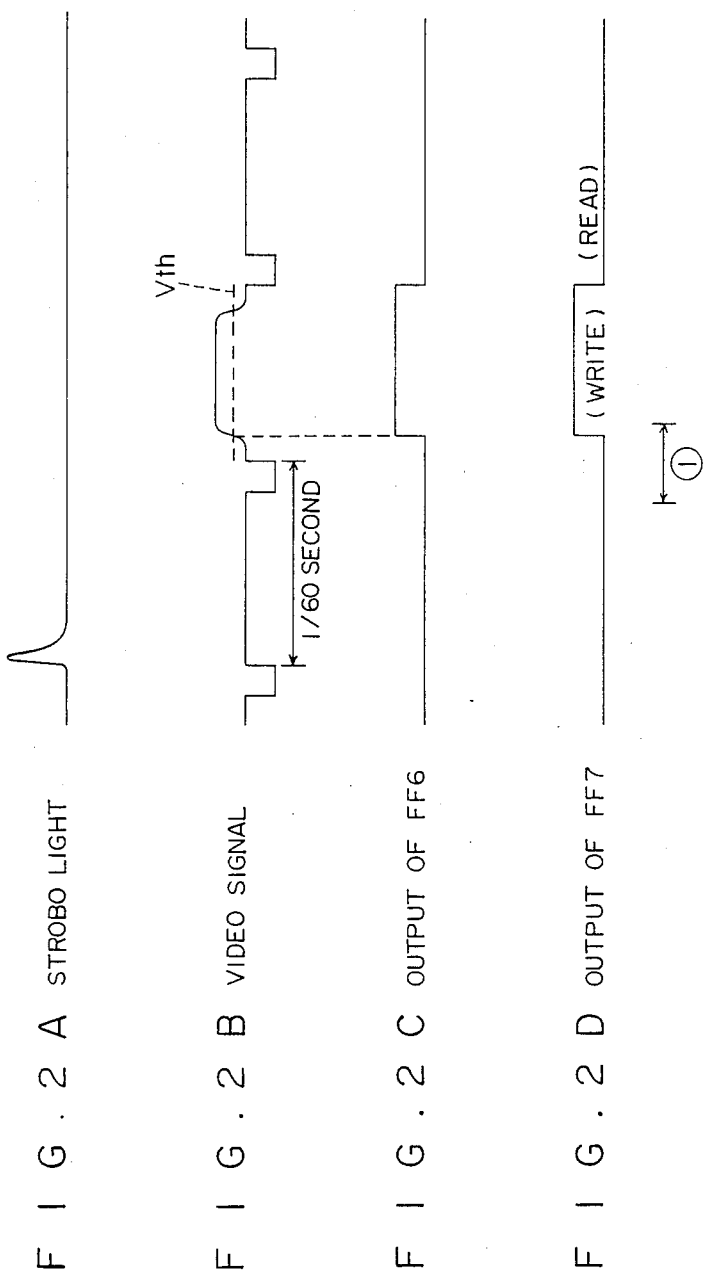
FIGS. 2A to 2D and FIGS. 3A to 3D are timing charts showing the sequence of operation of the apparatus of FIG. 1.
Figure 3:
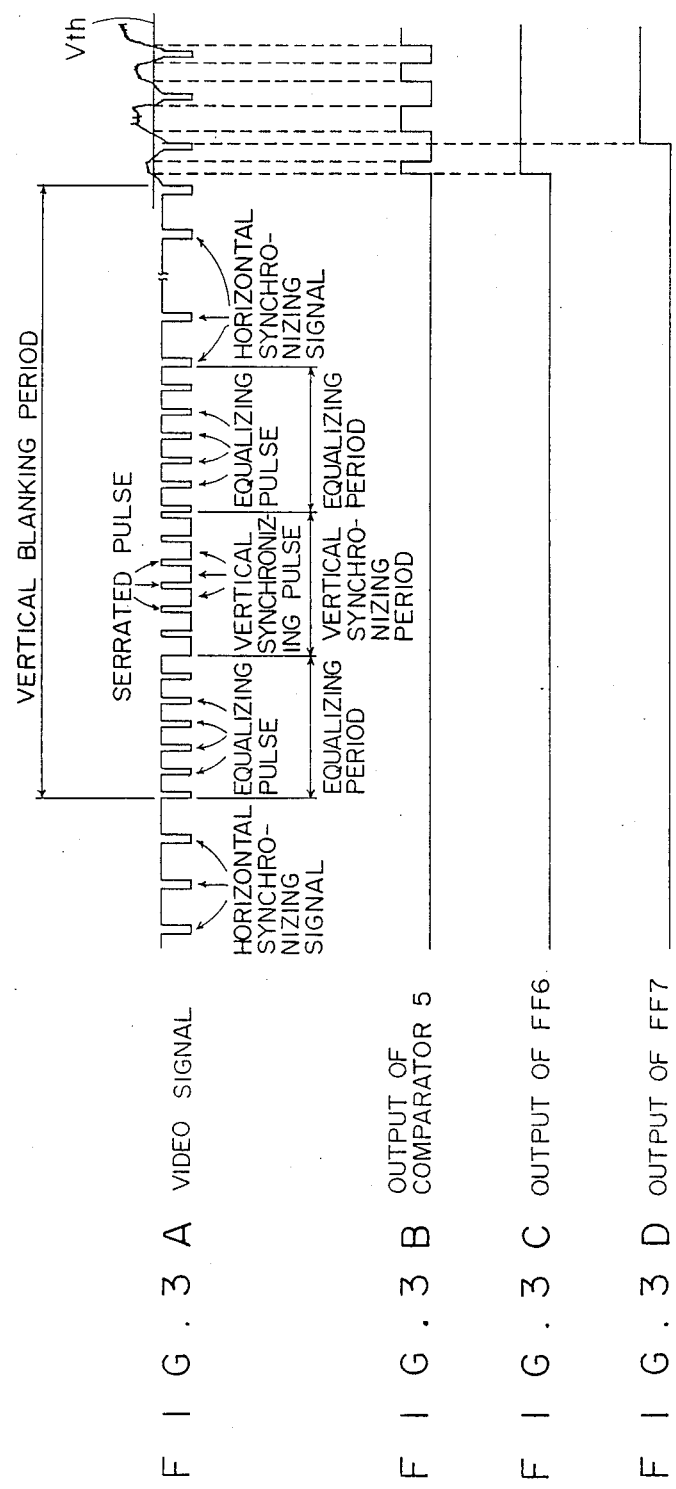

Now, referring to FIGS. 1 through 3, the operation of this embodiment will be explained.

Suppose a strobo is flashed at a certain time (FIG. 2A). The video signal produced at the output of the video camera 1 during the period of one field after the strobo flashing gives a bright image (FIG. 2B). For the periods other than the strobo flashing, the object photographed is dark and the corresponding video signal level is small, almost zero (black). If we assume that the light quantity at time of strobo flashing is 10 times (3 lens opening stops) greater than that when the strobo is not flashed, the voltage of the video signal is also 10 times higher than the video signal voltage obtained when the strobo is not flashed. If the peak of the video signal during the strobo flashing is 0.7 V, the peak when the strobo is not flashed will be 0.07 V, which is very small.

A certain threshold level Vth may be used, above which the video signal is taken to mean that the strobo has flashed.

The output of the video camera 1 is sent to the dc component reproducing circuit 2 which reproduces the dc component of the video signal with a high accuracy that enables detection of strobo flashing from video signal level. The dc component reproducing circuit 2 processes the video signal so that the black level will be a constant value. The video signal whose dc component has been reproduced accurately (FIG. 2B) is then fed to one input terminal of the comparator 5.

When the background is bright as in the certificate photograph, there is a change in brightness caused by strobo flashing, starting with 1 H (horizontal scanning period) immediately after the vertical blanking period (FIG. 3A). The video signal is compared with an appropriate threshold value Vth so that it is detected as the video signal illuminated by strobo. FIG. 3B represents an output of the comparator 5 by which the video signal and the threshold value Vth were compared. The high-level portions correspond to where the video signal level exceeds the threshold value Vth. This signal is applied to the flip-flop 6 whose output signal rises at the same time that the output signal of the comparator 5 rises, forming a pulse that goes low when the vertical synchronizing signal begins (FIGS. 2C, 3C). Since this pulse rises in the middle of the horizontal scanning period, it cannot be used as a memory write control signal. The output of the flip-flop 6 is supplied to the flip-flop 7 to produce a pulse that rises when the horizontal synchronizing signal rises (FIGS. 2D, 3D). This pulse is supplied to the field memory 4 as a memory write/read control signal.

As a result, until the memory write control signal is produced, the image data cannot be stored in the field memory nor can it be frozen and output (during the period of 1 H). However, this portion represents the portion of background of the image and thus there is no problem. The area that is lost (horizontal scanning line) does not have to be limited to 1 H alone, but it may cover a plurality of H periods as long as important parts of the image are not lost.

Figure 4:
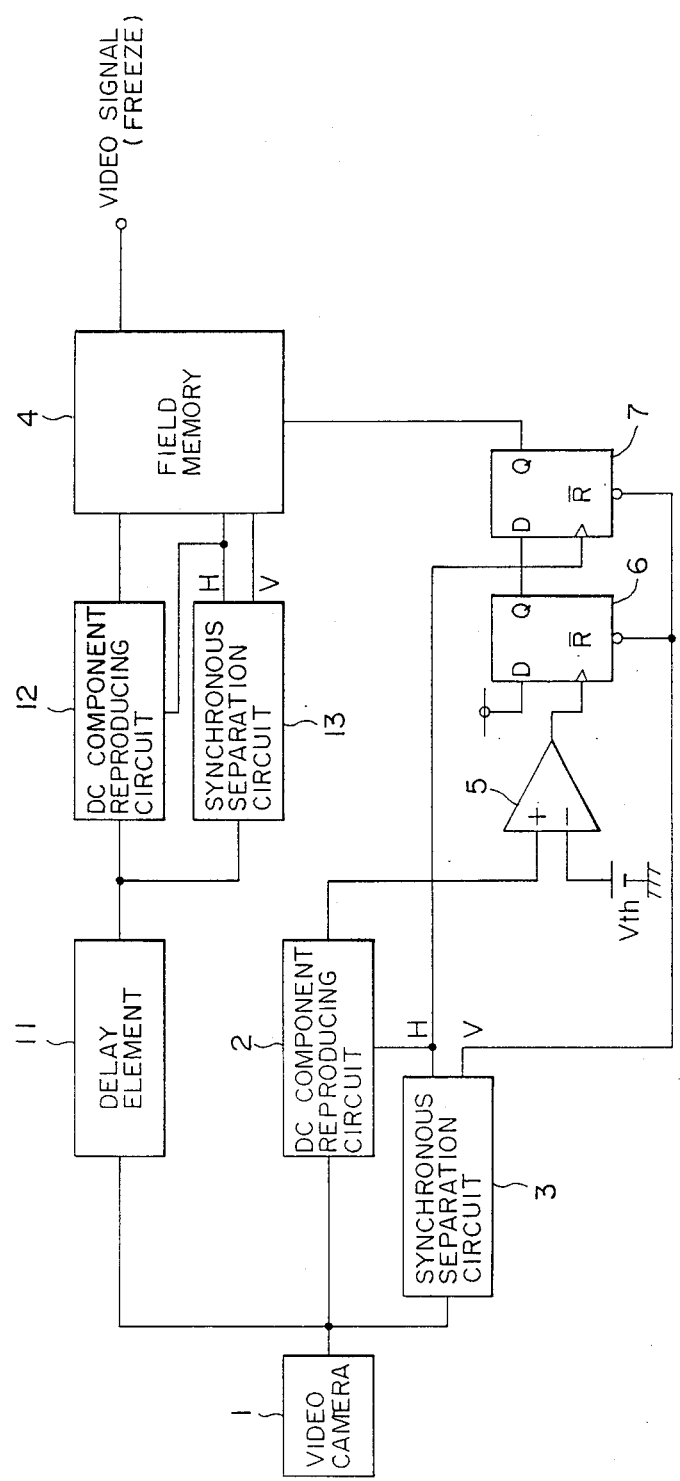
FIG. 4 is a block diagram showing the configuration of another embodiment of this invention.
Figure 5:
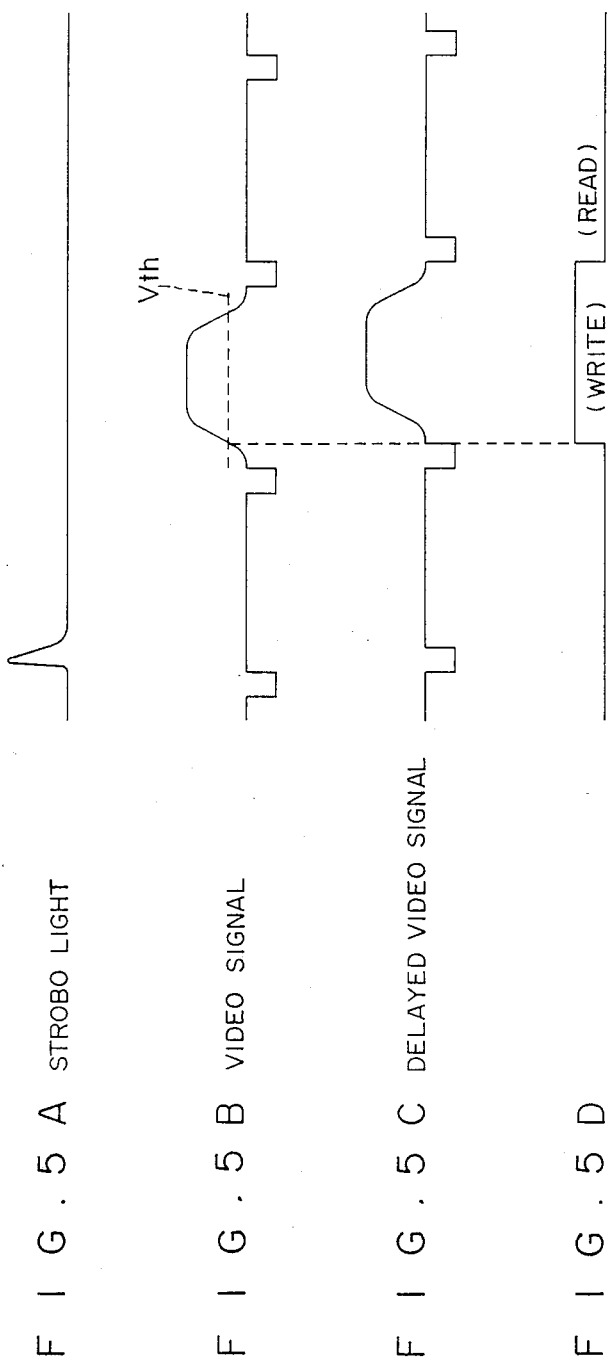
FIGS. 5A to 5D are timing charts showing the sequence of operation of the apparatus of FIG. 4.

FIG. 4 shows the configuration of other embodiment of this invention and FIGS. 5A to 5D show the timing chart showing the operation of the apparatus of FIG. 4. In FIG. 4, components identical with those of FIG. 1 are given like reference numbers and their description omitted. The video signals from the video camera 1 is supplied through a delay element 11 to a dc component reproducing circuit 12 which reproduces the dc component of the video signal, which in turn is written into a field memory 4. The synchronizing signal to be applied to the field memory 4 is a video signal delayed (FIG. 5C). With the configuration shown in FIG. 1, the time required to detect the brightness change in the video signal is one to several H periods, so that the upper part of the background in the image stored in the field memory 4 is lost according to one to several H periods. In the configuration of FIG. 4, the delay element 11 is given a delay time equal to the period required to detect brightness changes in the video signal (time required to produce a memory write control signal), and the delayed video signal from the delay element 11 is written into the field memory 4. Therefore, the leading edge of the memory write control signal coincides with the starting timing of the desired video signal (FIGS. 5C,5D), thus preventing a loss of upper part of the stored image.

Figure 6:
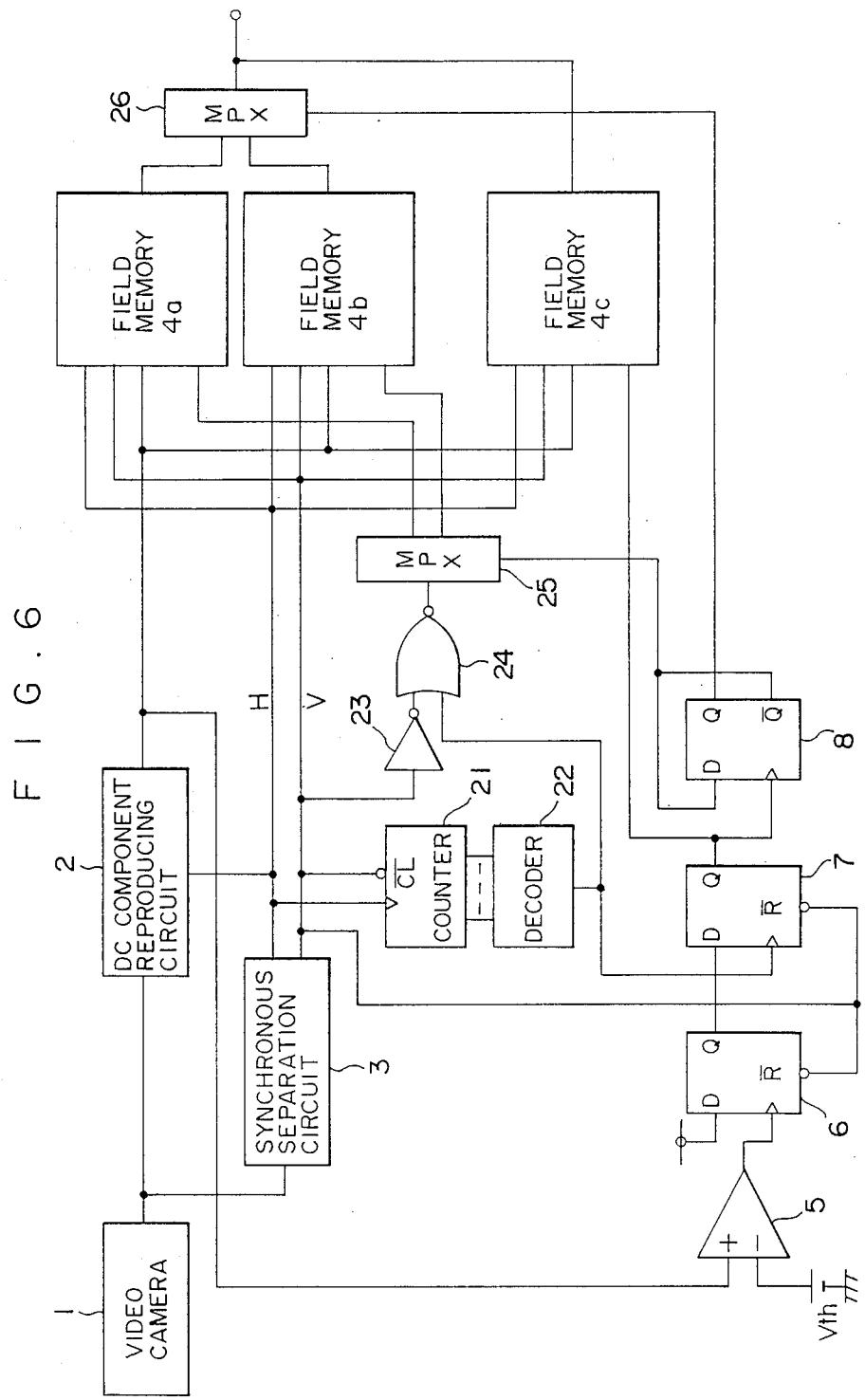
FIG. 6 is a block diagram showing the configuration of a further embodiment of this invention.

FIG. 6 shows the configuration of a still another embodiment of the invention. FIGS. 7A to 7G show the timing charts showing the sequence of operation of the apparatus of FIG. 6. In FIG. 6, components identical with those of FIG. 1 are given like reference numbers and their description omitted. In the circuit shown, a field memory 4a and a field memory 4b have the same memory capacity corresponding to L horizontal scanning lines in a period which is slightly longer than the horizontal scanning period from the start of the video signal to the detection of changes in the video signal. The field memories 4a, 4b, 4c are so set that the sum of the memory capacity of the field memory 4a (field memory 4b) and a field memory 4c corresponds to one field.

Figure 7:
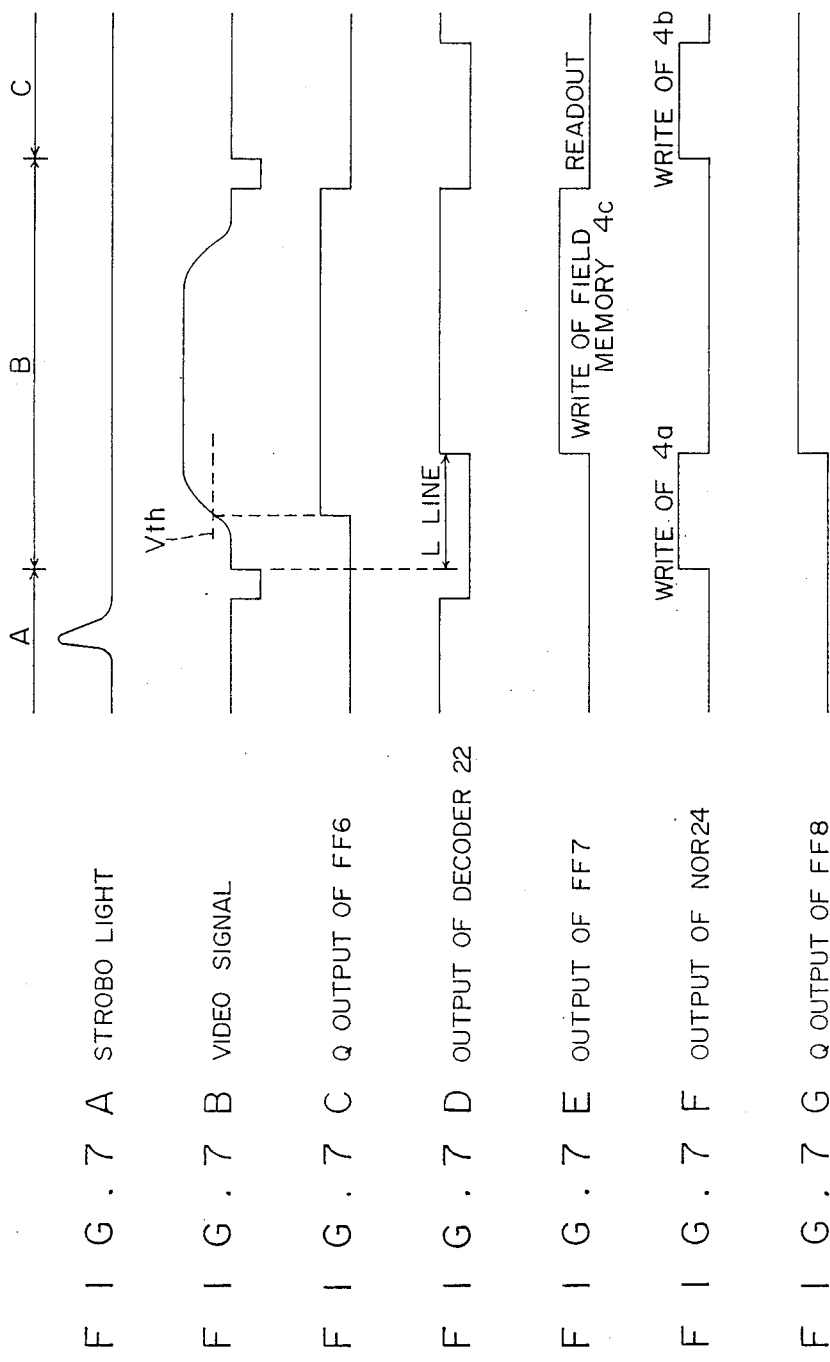
FIGS. 7A to 7G are timing charts showing the sequence of operation of the apparatus of FIG. 6.

Let us assume that the one field of image is already stored in the field memory 4b and the field memory 4c. In a B field, the L horizontal scanning lines are stored in the field memory 4a regardless of whether there is a memory write control signal (at this stage, the presence or absence of the memory write control signal is not known) (FIG. 7F). A counter 21 counts the horizontal synchronizing pulses and, when L pulses are counted, a decoder 22 produces a high-level signal (FIG. 7D). The output of the decoder 22 as well as the vertical synchronizing signal inverted by an invertor 23 are supplied to a NOR circuit 24, which produces a write control signal for L lines of video signal. The L-line write control signal is distributed by a multiplexer circuit MPX 25 to the field memory 4a and the field memory 4b according to the output Q of a flip-flop 8. In the B field, the memory write control signal is given to the field memory 4a. After this, the memory write control signal (output of the flip-flop 7) supplied to the field memory 4c goes high, storing the L+1st line and the succeeding lines in the field memory 4c. In this way, the image taken at the instant the strobo was flashed is frozen. In this example, there is no loss of any part of the image without use of the delay element.

After this (starting from a C field), lines up to Lth lines are written into the field memory 4b and, when a strobo flashes, the lines are also stored into the field memory 4c. The above sequence is repeated.

Figure 8:
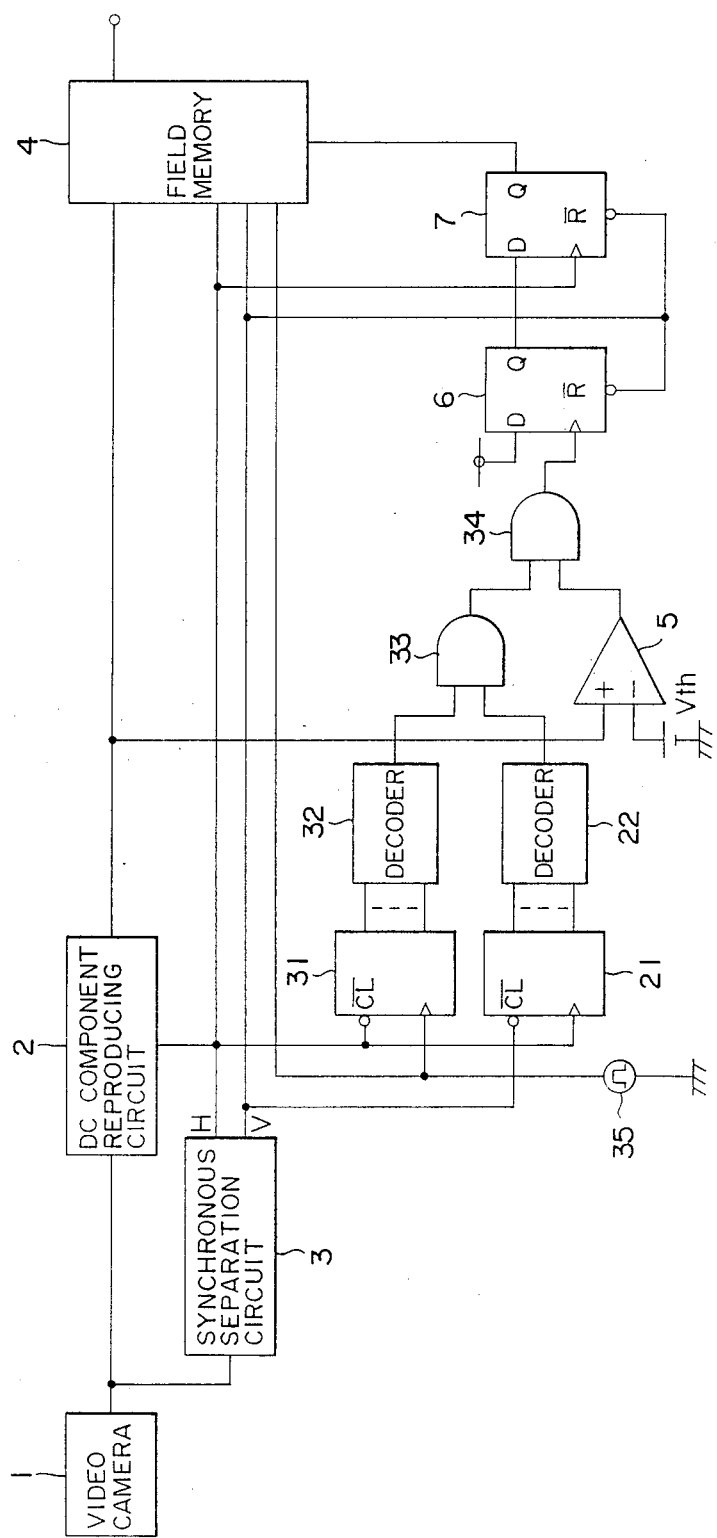
FIG. 8 is a block diagram showing the configuration of a further embodiment of this invention.

FIG. 8 shows the configuration of a further embodiment of the invention. FIGS. 9A to 9E are timing charts showing the sequence of operation of the apparatus of FIG. 8. In FIG. 8, components identical with those of FIG. 6 are given like reference numerals and their explanation omitted. This example is provided with a detection window to detect a brightness change in the video signal. That is, there are a counter 21 and a decoder 22 for detecting changes in the vertical (V) direction and a counter 31 and a decoder 32 for detecting changes in the horizontal (H) direction. This embodiment also has an AND circuit 33 which produces an ANDed output from the output of the decoder 22 and the output of the decoder 32 to form the detection window; an AND circuit 34 that produces an ANDed output from the signal of the detection window and a comparator circuit 5; and a memory read/write clock 35 for generating the memory read/write clock pulses.

FIG. 10 is a schematic diagram showing the image region of the video signal and the detection window region. The shaded area is the detection window region, which is defined by A to C in horizontal direction and B to D in vertical direction.

The counter 21 counts the horizontal synchronizing pulses and, when the pulses corresponding to B are counted, the decoder 22 produces a high-level output. When the count reaches D, it produces a low-level output (FIG. 9C). The counter 31 counts the pulses representing the pixels in the horizontal direction which are supplied from a memory read/write clock 35. When pulses corresponding to A area counted up, the decoder 22 produces a high-level output. When the count reaches C. the decoder 22 produces a low-level signal (FIG. 9D). The outputs of these decoders 21, 31 are applied to the AND circuit 33 to generate the detection window. The output of the comparator 5 (FIG. 9B) and the output of the AND circuit 33 are applied to the AND circuit 34, whose output is fed to the input of the flip-flop 6. Thus, the output of the flip-flop 6 goes high when the video signal is within the range of the detection window and exceeds the threshold value Vth (FIG. 9E). The output pulse of the flip-flop 6 is supplied to the flip-flop 7 which generates a pulse that rises in synchronism with the leading edge of the horizontal synchronizing signal. This pulse is supplied to the field memory 4 as a memory write/read control signal.

In this way, the detection window is generated and the brightness changes in the video signal is detected within the range of the detection window, ensuring reliable detection of the strobo flashing to the object to be photographed.

Although in this embodiment the video signal level is compared with the threshold value Vth to detect the strobo flashing, it may also be possible instead to use the average value of the video signal brightness level, or the sample-hold value at a particular point of the previous field of video signal. This configuration prevents the erroneous operation due to noise etc. By comparing the video signal level with that of the previous field, slight brightness changes can be detected.

Figure 11:
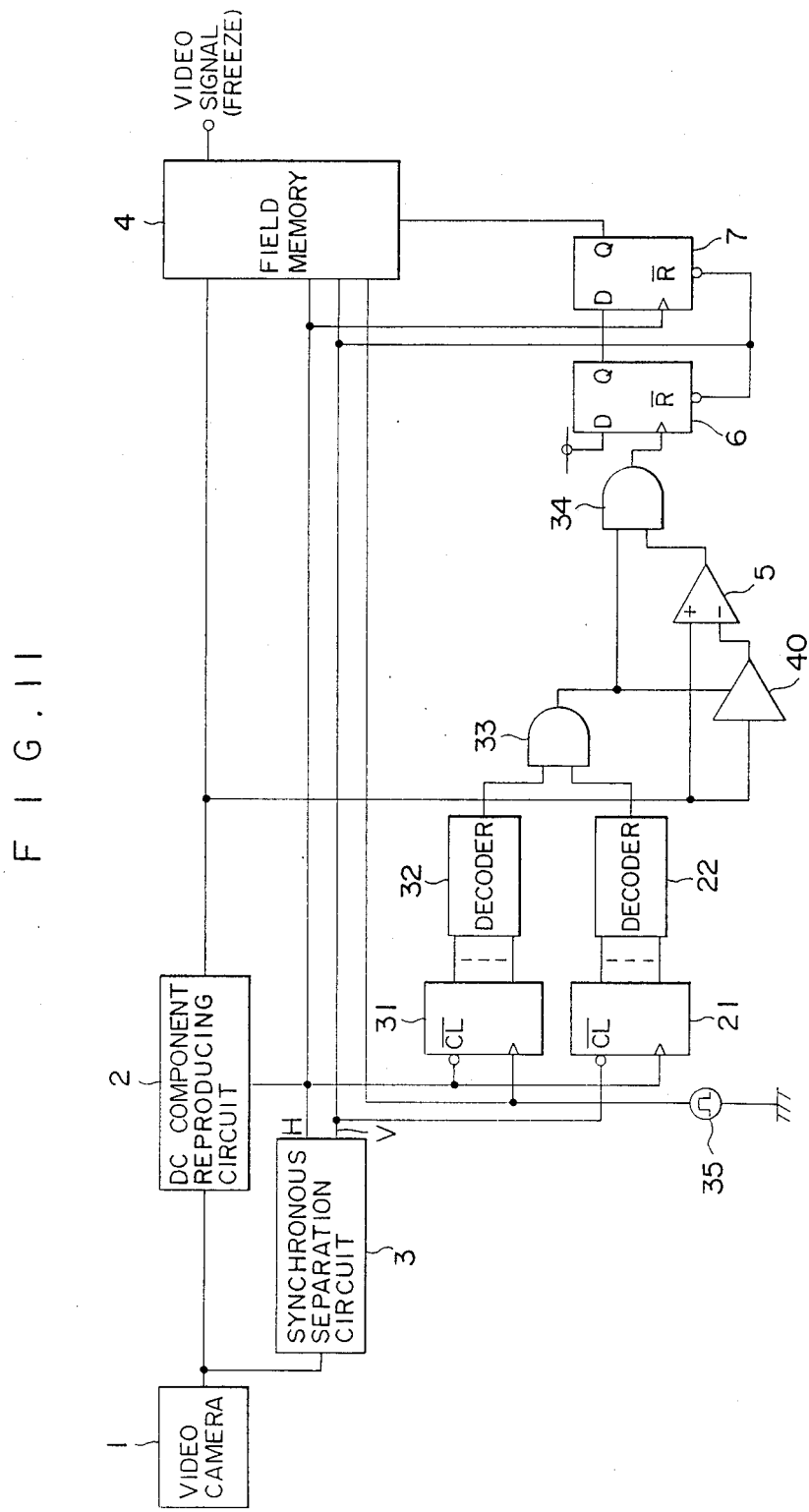
FIG. 11 is a block diagram showing the configuration of another embodiment of the invention.

FIG. 11 shows a configuration in which the sample-hold value at a particular point of the previous field of video signal is used instead of the threshold value. The components identical with those of FIG. 8 are given like reference numbers and their description omitted. In this configuration, a S/H amplifier 40 holds the brightness level of a particular point one field before and feeds it to a comparator 5. This makes it possible to detect a slight brightness variation in the video signal, improving the accuracy of detection.

It is also possible to use a monostable multibrator circuit instead of the counter used in the previous embodiments.

As mentioned above, with this embodiment it is possible to automatically detect the object illuminated by the strobo light and store the image of the object in memory. After the storage operation is completed, reading of the stored data is automatically performed, thus performing the freezing operation. The renewal of the stored image is automatically done each time the strobo is flashed.

FIG. 12 shows another embodiment of the invention in which components identical with those of FIG. 1 are given like reference numerals. Denoted 10 and 14 are flip-flops and 9 is AND circuit.

FIGS. 13A to 13H are timing charts showing the waveforms of each device of FIG. 12.

The operation of this embodiment will be explained below.

Let us assume the strobo is flashed at a certain timing (FIG. 13A). The video signal output from of the video camera 1 produces bright image two fields in a row after the flashing of strobo (FIG. 13B). In other periods the video signal level is small as the object is dark. The distance to the object and the light quantity are so set that the optimum exposure is obtained at the lens opening value of 32 when the strobo is flashed and at the lens opening value of 6 to 4 when the strobo is not flashed. If the lens opening is set at 32 at all times, the light quantity when the strobo is flashed is more than 32 times greater than that when the strobo is not flashed. If the peak of the video signal when the strobo is flashed is 0.7 V, the peak when the strobo is not flashed will be very small.

Then, a threshold value Vth is set at a certain level, above which the video signal is taken to mean that the strobo has flashed.

The output of the video camera 1 is sent to the dc component reproducing circuit 2, which reproduces the dc component of the video signal with a high accuracy that permits detection of strobo flashing from the level of the video signal. The dc component reproducing circuit 2 processes the video signal so that the black level of the video signal will be a constant value. The reproduced dc component of the video signal (FIG. 13B) is supplied to one input terminal of the comparator 5. Entered to the other input terminal of the comparator 5 is a reference voltage which corresponds to the threshold value Vth. The comparator 5 compares the two input voltages and produces a high-level output when the video signal level is higher than the threshold level Vth (FIG. 13D). This output is applied to the flip-flop 6 which then produces a pulse that rises at the leading edge of the comparator output (FIG. 13E). The flip-flop 7 receives the output of the flip-flop 6 and the vertical synchronizing signal and produces a pulse delayed one field from the output of the flip-flop 6 (FIG. 13F). The output Q of the flip-flop 7 and the output $\bar{Q}$ of the flip-flop 10 are applied to the AND circuit 9, which produces a high-level output during the period when the both inputs are high (FIG. 13G). This output is supplied to the field memory 4 as the memory read/write control signal. In this embodiment, the memory write control signal is generated in synchronism with the second field of the bright video signal (FIG. 13B). In other periods, the memory read control signal is produced.

Therefore, the image of the object illuminated by strobo flashing is automatically stored in memory. After the image storage is completed, a readout is automatically performed to freeze the image. This operation is automatically carried out each time the strobo is flashed.

While in this embodiment the video signal level is compared with the threshold level Vth to detect the strobo flashing, it is also possible to use the integrated value for each horizontal scanning cycle of the video signal and compare it with the threshold level. This configuration prevents erroneous operations due to noise etc. In this case, an integrator is inserted immediately before the positive input terminal of the comparator 5. The resetting of the integrator is done by the horizontal synchronizing signal (H-Sync).

As another example of configuration, a still video recording device may be used instead of the field memory 4.

FIG. 14 shows the configuration of an identification card (ID card) generating camera to which this invention is applied. The output of the video camera 1 is connected to the circuit shown in FIG. 12. Denoted 50 is a subject (a person who wants his or her ID card issued); 51 an ID card generating camera; 52 a lens of the ID card generating camera 51; 53 a photosensitive material; 54 a strobo to illuminate the subject; and 55 a half mirror positioned in front of the lens 52 to introduce a part of the light coming from the subject into the video camera 1.

The ID card generating camera directly exposes the subject along with the details of application form (name, address, etc.) on the photosensitive material 53. There may be a case where a person to be photographed closes his eyes or looks the other way, or there is a reflection from the glasses when an image is taken. In that case, the image must be taken again but it is difficult to determine whether that is necessary or not. To overcome this difficulty, the light reflected by the half mirror 55 is photographed by the video camera 1 to freeze the image of the subject taken at the instant the strobo 54 has just flashed. By monitoring the freezed image, the state of the person when the strobo was flashed can easily be checked.

The configuration shown in FIG. 14, however, has the following drawbacks. Depending on the transmission factor of the half mirror 55, the color balance on the photosensitive material 53 may shift; it is necessary to compensate for the reduction in light quantity caused by the half mirror; and the half mirror which is a foreign substance is mounted on the light axis.

It is therefore recommended that a mirror 56 be mounted at a position deviated from the light axis of the lens 52 as shown in FIG. 15 or 16. The mounting position of the mirror can be anywhere around the lens 52. This makes it possible to realize an apparatus with reduced depth. When the mirror is used, the image obtained is laterally reversed. Therefore, the direction of the horizontal picture element scanning of the video camera may have to be reversed or the horizontal deflecting coil of the TV monitor be wound in the opposite direction.

When the mirror is not used, a configuration of FIG. 17 can be used, in which the video camera 1 is mounted parallel with the light axis of the lens 52.

In the configurations of FIGS. 15 to 17, since the light axis of the lens 52 does not coincide with the light axis of the video camera 1, a half mirror, a mirror or a video camera need be installed as close to the lens 52 as possible in order to detect reflection from glasses worn by the subject person. In these examples also, the freezed image can easily be monitored to see what the person would look like at the moment the strobo was flashed, as in the case of FIG. 14. This configuration is more effective to check for eye closing.

While in the foregoing we have described the image memory apparatus of this invention as applied to the ID card generating camera, the invention is not limited to this alone and can be applied to any kinds of equipment as long as they have a strobo that flashes at any desired timing.

In this invention, the image illuminated by a strobo, which flashes at a desired timing, is written into memory and then read out to freeze the image photographed at the moment of strobo flashing. Furthermore, freezing can be performed each time the strobo flashes.

What is claimed is:

1. An image memory apparatus comprising: a photographing means for taking an image of a subject and outputting video signals of the image; an image memory means for storing the video signals for the photographing means; a detecting means for detecting changes in brightness level of the video signals from the photographing means; and a control signal generating means for supplying to the image memory means a write control signal according to the level changes of the video signal detected by the detecting means, the apparatus storing the image that exists in a field where the brightness level change in the video signal occurs in memory to freeze that image.

2. An image memory apparatus comprising: a photographing means for taking an image of a subject and supplying video signals of the image; an image memory means for storing the video signals from the photographing means; a detecting means for detecting changes in brightness level of the video signals from the photographing means; and a control signal generating means for supplying to the image memory means a write control signal according to the level changes of the video signal detected by the detecting means, wherein said detecting means detects a change in brightness in said video signals in a horizontal scanning period immediately after a vertical blanking period, and wherein said control signal generating means supplies the write control signal in synchronism with a horizontal synchronizing signal after the horizontal synchronizing signal of which change in brightness has been detected by said detecting means.

3. An image memory apparatus comprising: a photographing means for taking an image of a subject and supplying video signals of the image; an image memory means for storing the video signals from the photographing means; a detecting means for detecting changes in brightness level of the video signal from the photographing means; and a control signal generating means for supplying to the image memory means a write control signal according to the level changes of the video signal detected by the detecting means, wherein said video signals from said photographing means are supplied to both of said image memory means and said detecting means, and wherein a delay circuit have a delay time equal to a period required to detect the change in brightness level of the video signals by said detecting means is provided in a prestage of said image memory means.

4. An image memory apparatus comprising: a photographing means for taking an image of a subject and supplying video signals of the image; an image memory means for storing the video signals from the photographing means; a detecting means for detecting changes in brightness level of the video signal from the photographing means; and a control signal generating means for supplying to the image memory means a write control signal according to the level changes of the video signal detected by the detecting means, wherein said image memory means comprises a first field memory having a memory capacity corresponding to L horizontal scanning lines, and a second field memory having a memory capacity corresponding to horizontal scanning lines which are so determined that the sum of the memory capacities of said first and second field memories becomes one field, and further comprising means for storing in said first field memory a signal corresponding to first L horizontal scanning lines of said video signals irrespective of said write control signal, and for storing in said second field memory a signal corresponding to L+1st and the succeeding horizontal scanning lines of said video signals on the basis of said write control signal.

5. An image memory apparatus comprising:
photographing means for taking an image of a subject and providing video signals of the image, said photographing means providing the image in multiple fields in time sequence;
image memory means for storing the video signals from the fields provided by the photographing means;
detecting means for detecting the brightness level of the video signals;
comparison means for comparing the brightness level detected by said detecting means to a reference brightness and for generating a signal when the reference brightness is exceeded; and
control signal generating means, including means for detecting the start of the field after the generated signal, for supplying to the image memory means a write control signal corresponding to the field after the generated signal.

* * * * *